United States Patent [19]

Haq et al.

[11] Patent Number: 4,603,069
[45] Date of Patent: Jul. 29, 1986

[54] SHEET-LIKE ARTICLE

[75] Inventors: Zia Haq, Merseyside; Richard Harbour, Wellingborough; Donald Peter, Merseyside; Serge A. Symien, Bedford, all of England

[73] Assignee: Lever Brothers Company, New York, N.Y.

[21] Appl. No.: 737,585

[22] Filed: May 24, 1985

Related U.S. Application Data

[63] Continuation of Ser. No. 553,663, Nov. 21, 1983, abandoned.

[30] Foreign Application Priority Data

Nov. 26, 1982 [GB] United Kingdom ............ 8233774

[51] Int. Cl.$^4$ .................... B32B 3/10; B32B 3/24
[52] U.S. Cl. .................... 428/76; 15/104 R; 15/209 R; 15/209 B; 15/209 C; 428/138; 428/139; 428/195; 428/198
[58] Field of Search ............ 428/76, 138, 139, 195, 428/198; 15/104 R, 209 R, 209 B, 209 C

[56] References Cited

U.S. PATENT DOCUMENTS

| | | | |
|---|---|---|---|
| 3,014,233 | 12/1961 | Gibbons | 15/209 C |
| 3,255,127 | 6/1966 | Bonin et al. | 521/62 |
| 3,482,567 | 12/1969 | Franklin | 428/198 |
| 3,720,534 | 3/1973 | Macaulay et al. | 428/321.1 |
| 3,935,099 | 1/1976 | Weaver et al. | 210/689 |
| 4,239,792 | 12/1980 | Ludua | 428/198 |

FOREIGN PATENT DOCUMENTS

| | | |
|---|---|---|
| 294752 | 4/1967 | Australia . |
| 46021 | 2/1982 | European Pat. Off. . |
| 60138 | 9/1982 | European Pat. Off. . |
| 66463 | 12/1982 | European Pat. Off. . |
| 68830 | 1/1983 | European Pat. Off. . |
| 1035475 | 7/1966 | United Kingdom . |
| 1358171 | 6/1974 | United Kingdom . |
| 1393174 | 5/1975 | United Kingdom . |
| 1401231 | 7/1975 | United Kingdom . |
| 1417293 | 12/1975 | United Kingdom . |
| 1522759 | 8/1978 | United Kingdom . |
| 1574498 | 9/1980 | United Kingdom . |
| 1587411 | 4/1981 | United Kingdom . |
| 2063058 | 6/1981 | United Kingdom . |

Primary Examiner—Paul J. Thibodeau
Attorney, Agent, or Firm—Milton L. Honig; James J. Farrell

[57] ABSTRACT

A sheet-like article suitable, for example, for wiping hard surfaces, comprises two sheets of nonwoven fabric or the like having sandwiched between them a solid core material which may be a highly porous, optionally liquid-containing, polymer. The two outer sheets are bonded to each other, without involving the core material, by means of a plurality of small, spaced bonding points, for example, spot-welds. Preferably the core material is in continuous sheet form and is perforated to accommodate the bonding points.

10 Claims, 3 Drawing Figures

SHEET-LIKE ARTICLE

This is a continuation of Ser. No. 553,663, filed Nov. 21, 1983, now abandoned.

The present invention relates to a laminated flexible sheet-like article suitable for wiping a surface, for example, the surface of a household or industrial object, or the human skin, in order either to deliver a liquid active material to that surface or to pick up liquid from that surface; or for gradually releasing an active material, such as a bubble bath composition, an air-freshener or a perfume, without surface contact. The article includes a solid core material, for example a highly porous polymer containing a liquid active material such as a detergent or a skin treatment material, sandwiched between outer layers of web or sheet material.

EP No. 68 830 (Unilever) discloses an article suitable for delivering or absorbing a liquid, the article comprising a substrate carrying a pressure-sensitive porous polymeric material capable of retaining at least 5 times, and preferably at least 10 times, its own weight, defined in terms of water, of liquid, and of releasing at least some of that liquid on the application thereto of hand pressure, the porous polymeric material being dry or containing an aqueous or non-aqueous liquid.

Within that generic concept are two possibilities: the porous polymeric material may be dry, to give an article useful for mopping up liquid spillages, or it may carry a liquid which can be expressed from the article by the application of hand pressure. In some cases the polymer may contain 40 times its own weight of liquid, yet feel dry to the touch.

One class of polymers that has been found highly effective in this type of article is constituted by the polymerisation products of high internal phase emulsions, in particular styrene-based polymers. EP No. 60 138 (Unilever) discloses and claims a class of such polymers.

In preparing sheet-like or cloth-like articles incorporating these porous polymers difficulties have been experienced owing to the fact that these polymers are not, in general, readily bonded either by heat-sealing or by means of an adhesive. Thus a sheet of liquid-carrying polymer cannot simply be sandwiched between two layers of heat-sealable nonwoven fabric or the like and the whole bonded together by heat-sealing or adhesive to form a composite cloth-like article. If the edge regions only are heat-sealed together the porous material in the middle is not located with respect to the outer layers and can move about, resulting in crumpling or or even, with some polymers, cracking.

According to a proposal described in EP No. 66 463 (Unilever) individual squares of polymer or other porous material may be located in individual cells of a sandwich structure obtained by bonding together two outer layers of nonwoven fabric or the like in a grid or similar pattern. This arrangement, while having excellent feel and giving the possibility of controlled release of liquid at different rates from different cells, has the disadvantage that assembly is difficult and slow; the squares of polymer must be accurately positioned with respect to the outer layers before bonding.

According to the present invention, a sheet-like or cloth-like article in which an intermediate material is sandwiched between two outer sheet substrates can be produced in which the layers are held together in register, using a simple method of assembly.

The present invention accordingly provides a flexible sheet-like article suitable for use as a wiping cloth and/or for delivering an active material (as hereinafter defined), the article comprising first and second sheet substrates, at least one being liquid-permeable, and, sandwiched between them, an intermediate layer of solid core material comprising absorbent and/or active (as hereinafter defined) material, the first and second substrates being bonded to one another, without involving the intermediate layer, at a plurality of locations of relatively small area distributed relatively uniformly over the area of the article.

The bonding may be by any suitable means. An adhesive may if desired be used, but bonding of the substrates themselves by a welding method, such as heat-sealing or ultrasonic welding, is especially preferred. In this case it is necessary for both the outer layers (first and second sheet substrates) to consist at least partially of thermoplastic material. Spot-welding is an especially convenient method of producing the small bonding points required according to the invention.

The nature of the core material forming the intermediate layer will depend on the intended use of the article. It may for example be a highly absorbent material, when the article is intended for use as a wiping cloth for mopping up liquid spillages and the like. On the other hand, the primary purpose of the article of the invention may be the delivery of a cleaning composition, disinfectant, skin treatment agent or other beneficial material, referred to generically in the present specification as an "active" material. In this case the core material will consist wholly or partially of such an active material, and may also include a carrier, for example a porous polymer, by means of which delivery of the active material may be controlled. The active material may be in liquid or solid form, but if the active material is a liquid the use of a solid carrier is necessary.

According to one preferred embodiment of the invention, the intermediate layer is in continuous sheet form and is provided with a plurality of relatively small perforations through which the first and second sheet substrates are bonded together.

Conveniently the bonding points, for example spot welds, are substantially circular, and the perforations through which they are made are small substantially circular orifices. In principle, however, the bonding points and the corresponding perforations in the intermediate layer may be of any shape provided that they are of small area in comparison with the area of the sheet.

Preferably the bonding points are spaced so as to form a regular pattern. The distance between adjacent bonding points should not be too small, to allow the major part of the area of the article to be available for performing its function of taking up liquid, soil etc. and/or delivering active material. Equally, the spacing should not be too large, or the layers will not be adequately held in register with one another.

Preferably, the portion of the sheet covered by the perforations should have a total area not exceeding the solid surface area therebetween and the distance between adjacent locations being substantially greater than the dimensions of the bonding locations themselves. Advantageously the minimum spacing between two adjacent bonding points on the article is within the range of from 5 to 100 mm, preferably from 10 to 60 mm and more preferably from 15 to 50 mm.

In the addition to the small bonding points distributed over the whole sheet, it will generally be necessary for the article to be closed along the edges by bonding together the edge regions of the first and second sheet substrates. In the case where the intermediate layer is in continuous sheet form, these sheet substrates should be slightly larger than the intermediate layer.

The first and second sheet substrates may be of any suitable flexible sheet material, and may be of the same or of different materials, the only prerequisite being that at least one, preferably both, is or are liquid-permeable: it is essential that liquid can pass out of or into the intermediate layer. In the case of a dry, absorbent article (wiping cloth), spilt liquid mopped up must have access to the absorbent core material; in the case of a core of solid active material, the article will need to be wetted before use and water will need to penetrate to the active material and dissolve or disperse it out; and in the case of a liquid active material, that material will need a means of egress from the core. Thus at least one of the first and second sheet substrates will need to be permeable to liquid, i.e. inherently liquid-permeable and/or provided with openings.

Advantageously one or both substrate layers comprise paper or nonwoven fabric. If heat-sealability is required, this may be derived from the presence of a proportion of thermoplastic fibres in the main substrate material, or from the presence of an additional layer or coating of thermoplastic material. This may take the form, for example, of a layer of lightweight thermoplastic nonwoven fabric, or a continuous or discontinuous coating of thermoplastic sheet or film material. If a continuous layer or coating is present it must be perforated to allow liquid to pass through. In the finished article, the coated side will of course be innermost.

A material, that may be advantageously used for both first and second substrate layers, is a porous, bulky, lofty paper or nonwoven fabric of high void volume, coated on the inner side with polyethylene film pinholed at suitable intervals.

The use of relatively absorbent material for the substrate layers is of particular advantage for an article of the invention to be used for wiping a surface in order, for example, to clean, polish, disinfect, or medically or cosmetically treat, that surface.

As previously indicated, in one embodiment of the invention the intermediate layer comprises a porous carrier material containing a liquid active material which can be any liquid that can be usefully and beneficially delivered by a sheet-like article according to the invention. The liquid may be hydrophobic or hydrophilic. Examples of such liquids include soap and detergent compositions, bleach, disinfectant, bubble bath and shower preparations, air fresheners, skin treatment agents, dry cleaning solvents, perfumes, and many more.

The porous carrier material may consist of any suitable material having adequate absorbency of liquids. It may, for example, be a conventional plastics foam. Preferably, however, the porous material is capable of retaining liquid as well as absorbing it. A preferred carrier material is a porous polymer cabable of retaining at least 5 times its own weight of liquid, defined in terms of water, and of releasing at least some of that liquid on the application of hand pressure. A polymer capable of retaining at least 10 times, preferably at least 25 times and more preferably at least 40 times, its own weight of liquid, is especially advantageous. The liquid preferably constitutes at least 90%, more preferably at least 95%, of the weight of the polymer and liquid together. Details of suitable polymers are given in EP No. 68 830 (Unilever).

The porous polymer preferably has a pore volume greater than 9 cc/g, more preferably greater than 15 cc/g.

The dry density of the polymer is preferably less than 0.1 g/cc, more preferably within the range of from 0.03 to 0.08 g/cc. This is the density of the material when its pore system contains air. Some polymers according to the invention, however, cannot exist in the dry state; they are prepared by methods which leave the pore system full of liquid, and this liquid can if desired be exchanged for another liquid, but if dried their pore system collapses.

In a preferred embodiment of the invention, the polymer is the polymerisation product of a high internal phase emulsion having an aqueous internal phase, and a continuous phase comprising one or more polymerisable hydrophobic monomers. It is especially preferred that the aqueous internal phase constitutes 90% or more by weight, preferably at least 95% by weight, of the emulsion. Polymers of this type are described in more detail in EP No. 60 138 and EP No. 68 830 (Unilever). If a single monomer is used, it must be hydrophobic; a monomer mixture must be predominantly hydrophobic. Vinyl polymers are of special interest, styrene homo- and copolymers being especially preferred. Light crosslinking is of advantage in improving both the capacity for absorption and retention of liquids and the dimensional stability. Two types of polymers that have been found useful are polystyrenes lightly cross-linked with divinyl benzene, and styrene/butyl methacrylate copolymers lightly cross-linked with allyl methacrylate.

A porous polymer as disclosed in the four preceding paragraphs has the advantage that liquid contained in it remains enclosed within the polymer unless expressed by the application of hand pressure; the liquid-containing polymer can consist of liquid to an extent of 98% by weight or more while feeling virtually dry to the touch. Thus an article containing a high proportion by weight of entrapped liquid can be produced.

The article can remain dry during handling and storage, until the liquid in the polymer is released at the point of use by the application of pressure. It is also within the scope of the invention for the article to be wet, for example, impregnated, either with the liquid contained in the polymer or with a different liquid. If a second liquid is present, this may not necessarily be compatible with the first, since mixing will not occur until the polymer is squeezed in use. One or more further liquids may if desired be present in microencapsulated form. This is especially advantageous in the case of mutually incompatible liquids.

In one particular preferred embodiment of the invention, the sheet-like article of the invention is intended for application to reflective household surfaces such as mirrors, windows, tiles, paintwork and furniture to give a substantially streak-free finish. Such an article has the advantage that it can be applied directly to the surface to be cleaned; the surface need only be wiped over and then allowed to dry. No additional liquid and no cloths or tissues are required; thus contamination by streak-forming impurities is eliminated.

In this embodiment the liquid in the void system of the porous polymer is a homogeneous aqueous liquid composition having a surface tension of less than 45 mNm$^{-1}$, preferably less than 35 mNm$^{-1}$, which composition, when applied to a surface and allowed to dry, dries substantially without forming discrete droplets or particles larger than 0.25 μm, preferably 0.1 μm. The liquid preferably contains a surface-active agent, more preferably a nonionic surface-active agent, at a relatively low concentration, and a lower aliphatic alcohol, preferably ethanol or isopropanol; a film forming polymer may also be present. Suitable liquid compositions are described in detail in EP No. 67 016 and EP No. 68 830 (Unilever).

An article according to the invention will now be described in more detail, by way of example only, with reference to the accompanying drawings, in which.

Figure 1:
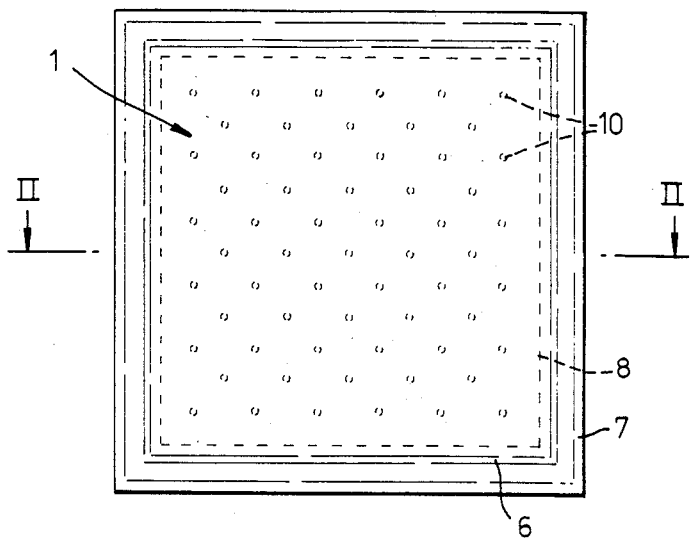
FIG. 1 is a plan view of the article.
Figure 2:
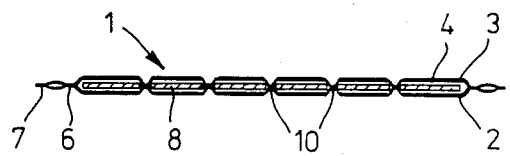
FIG. 2 is a section along the line II—II in FIG. 1.
Figure 3:
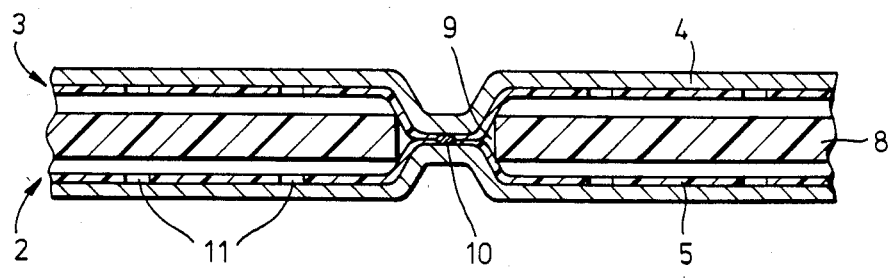
FIG. 3 is an enlarged view of part of FIG. 2.

Referring now to FIGS. 1, 2 and 3, the article 1 comprises first and second substrates 2 and 3 each of which consists of an outer layer of bulky, lofty, wet-strength paper 4 and an inner coating 5 of polyethylene. These are heat-sealed together in their edge regions, by means of the polyethylene coatings 5, along the lines 6 and 7.

Sandwiched between the substrates 2 and 3 is an intermediate layer 8 of flexible, highly porous polymeric material carrying a liquid. The layer 8 has a regular pattern of relatively small perforations 9 over its whole area, and the substrates 2 and 3 are bonded together by a spot weld 10 through each perforation 9. The spacing between adjacent spot-welds is 30 mm.

The polyethylene coating 5 on each substrate 2 or 3 is provided with pinholes 11 for the passage of liquid from the porous polymer 8.

The polyethylene-coated substrates could if desired be replaced by uncoated substrates of nonwoven fabric having a sufficient proportion of thermoplastic fibres for heat-sealability, or by non-thermoplastic substrates provided with a covering layer of light-weight thermoplastic nonwoven fabric. Pinholes would not then be necessary because the liquid could pass through the nonwoven fabric(s).

The article feels to the hand like a fairly bulky cleaning cloth such as a chamois leather. In use, it is squeezed to express a suitable amount of liquid through the pinholes 11.

The sheet-like article of the invention may be used for many purposes, for example, hand and face cleaning; skin treatment other than cleaning (for example anti-acne treatment); baby hygiene; cleaning, polishing, disinfecting or deodorising industrial and domestic surfaces (for example, windows, paintwork, machinery, carpets, clothing, shoes); air freshening and perfume delivery; and hospital hygiene. Other possible uses will readily suggest themselves to the worker skilled in the art.

We claim:

1. A flexible sheet-like article comprising first and second sheet substrates, at least one of which is liquid-permeable, having sandwiched between them an intermediate layer in continuous sheet form of solid core material selected from the group consisting of absorbent and active material, the first and second substrates being bonded to one another through a plurality of relatively small perforations, which perforations penetrate said intermediate layer solid core material yet without said bonding involving the intermediate layer, at a plurality of locations of relatively small area distributed relatively uniformly over the area of the article, said relatively small perforations and relatively small areas having a total area not exceeding that of the solid surface areas therebetween, and the distance between adjacent bonding locations being substantially greater than the dimensions of the bonding locations themselves.

2. The article of claim 1, wherein the first and second sheet substrates consist at least partially of thermoplastic material and are bonded together by heat-sealing.

3. The article of claim 1, wherein the minimum distance between any two bonding locations is within the range of from 5 to 100 mm.

4. The article of claim 1, wherein the core material comprises a pressure-sensitive porous polymeric material capable of retaining at least 5 times its own weight, defined in terms of water, of liquid and of releasing at least some of said liquid on the application thereto of hand pressure, the porous polymeric material being dry or containing an aqueous or non-aqueous liquid.

5. The article of claim 4, wherein the porous polymeric material is capable of retaining at least 25 times its own weight of liquid, defined in terms of water.

6. The article of claim 4, wherein the porous polymeric material is the polymerisation product of a high internal phase emulsion having an aqueous internal phase.

7. The article of claim 1, wherein the core material comprises a porous material containing a liquid which constitutes at least 90% of the weight of the liquid and the porous material together.

8. The article of claim 1, wherein one or both of the first and second substrate layers comprises paper or nonwoven fabric having a coating of thermoplastic material.

9. The article of claim 1, wherein the intermediate layer of solid core material comprises solid porous material containing a homogeneous aqueous liquid composition having a surface tension of less than 45 mNm$^{-1}$, which composition, when applied to a surface and allowed to dry, dries substantially without forming discrete droplets or particles larger than 0.25 μm.

10. The article of claim 8, wherein the coating of thermoplastic material is continuous and provided with pinholes for the passage of liquid.

* * * * *